Patented Jan. 1, 1929.

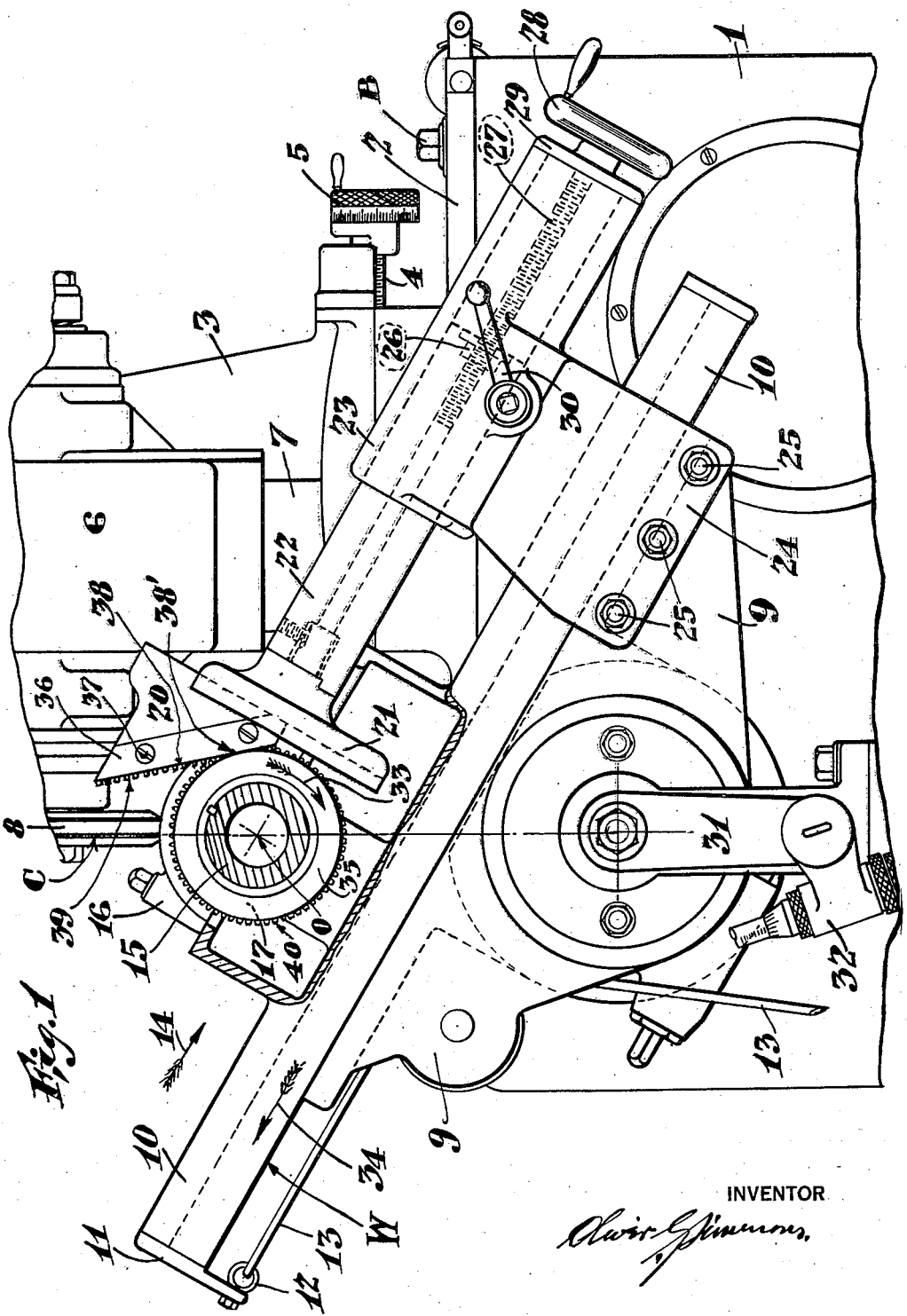

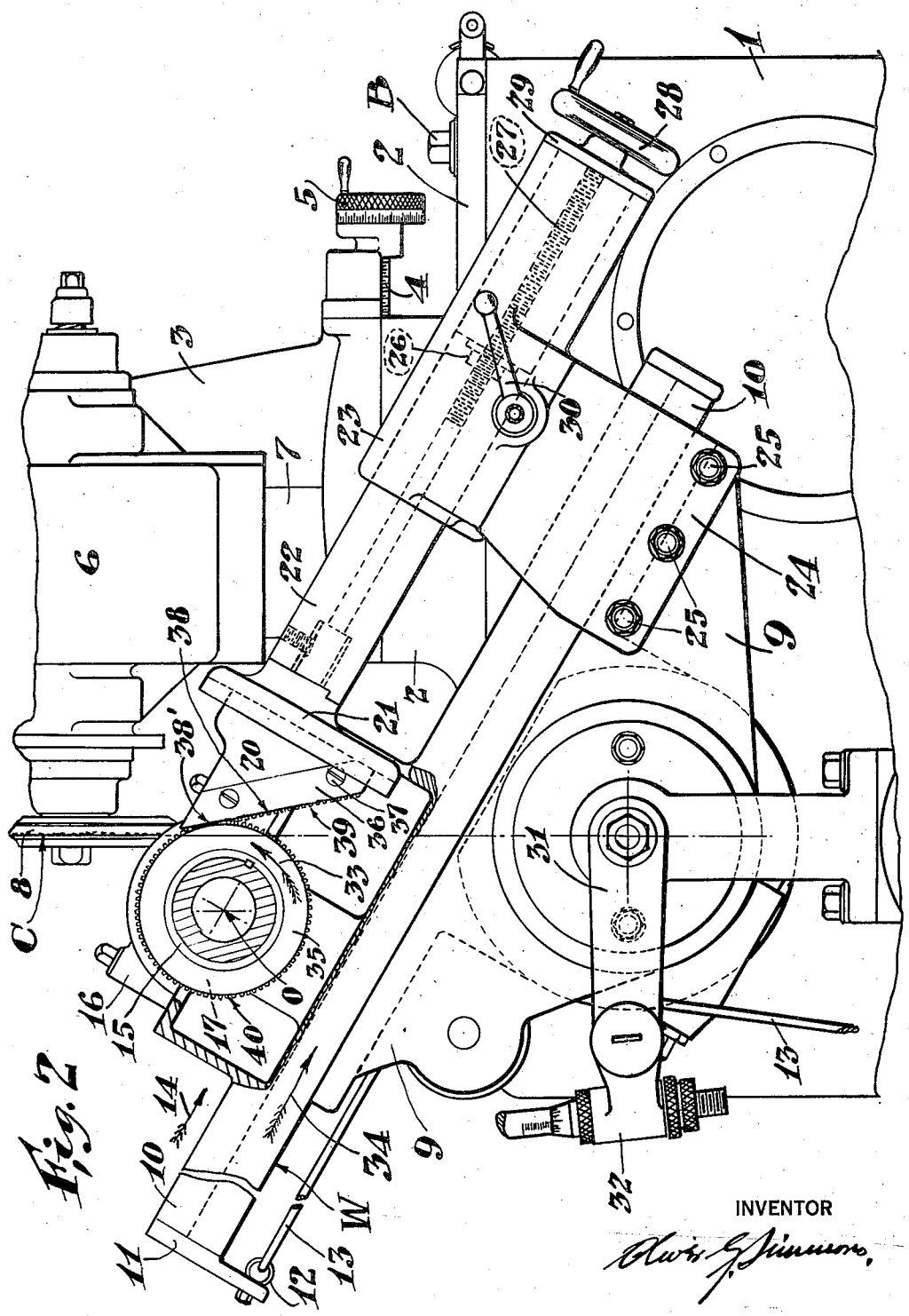

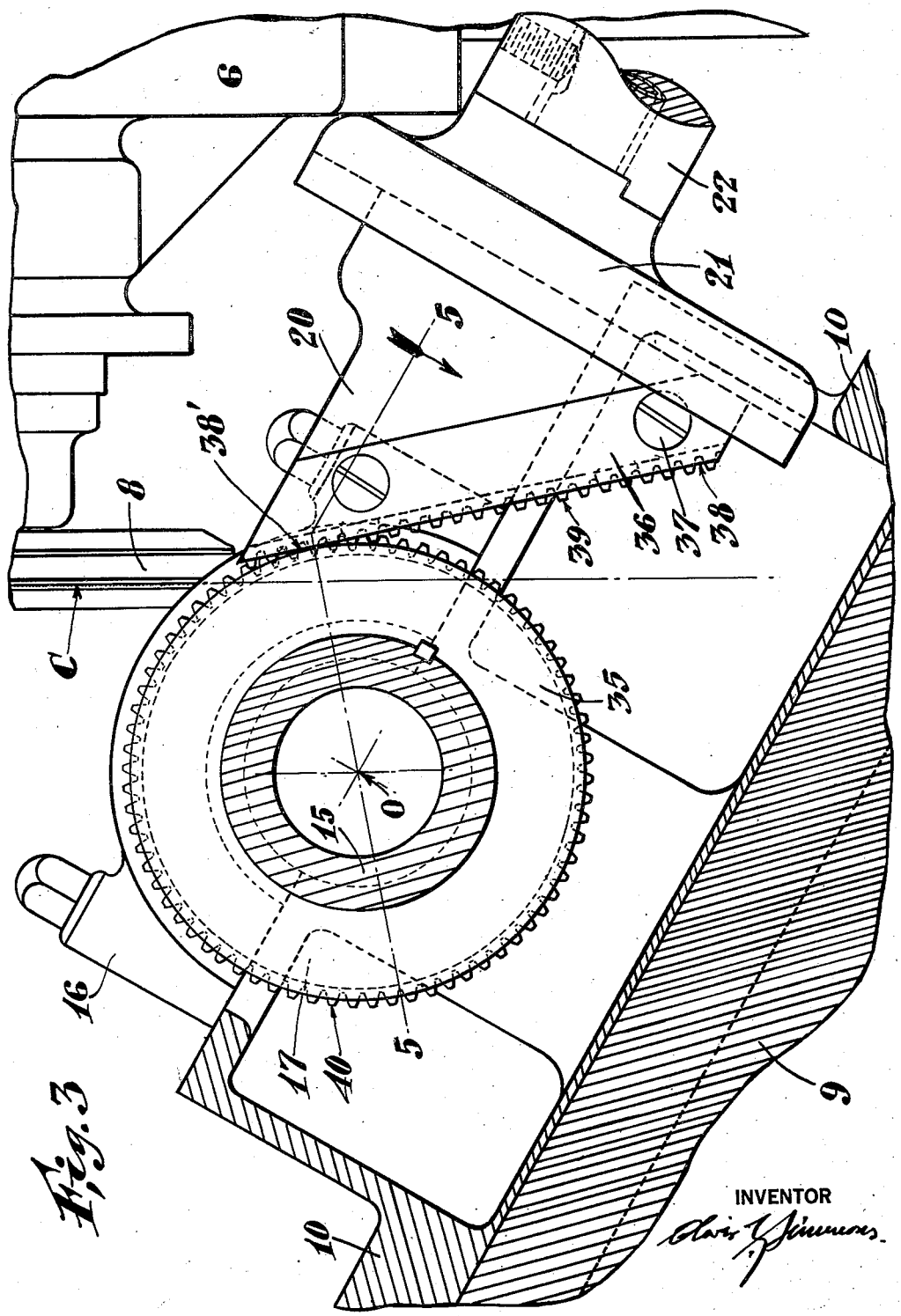

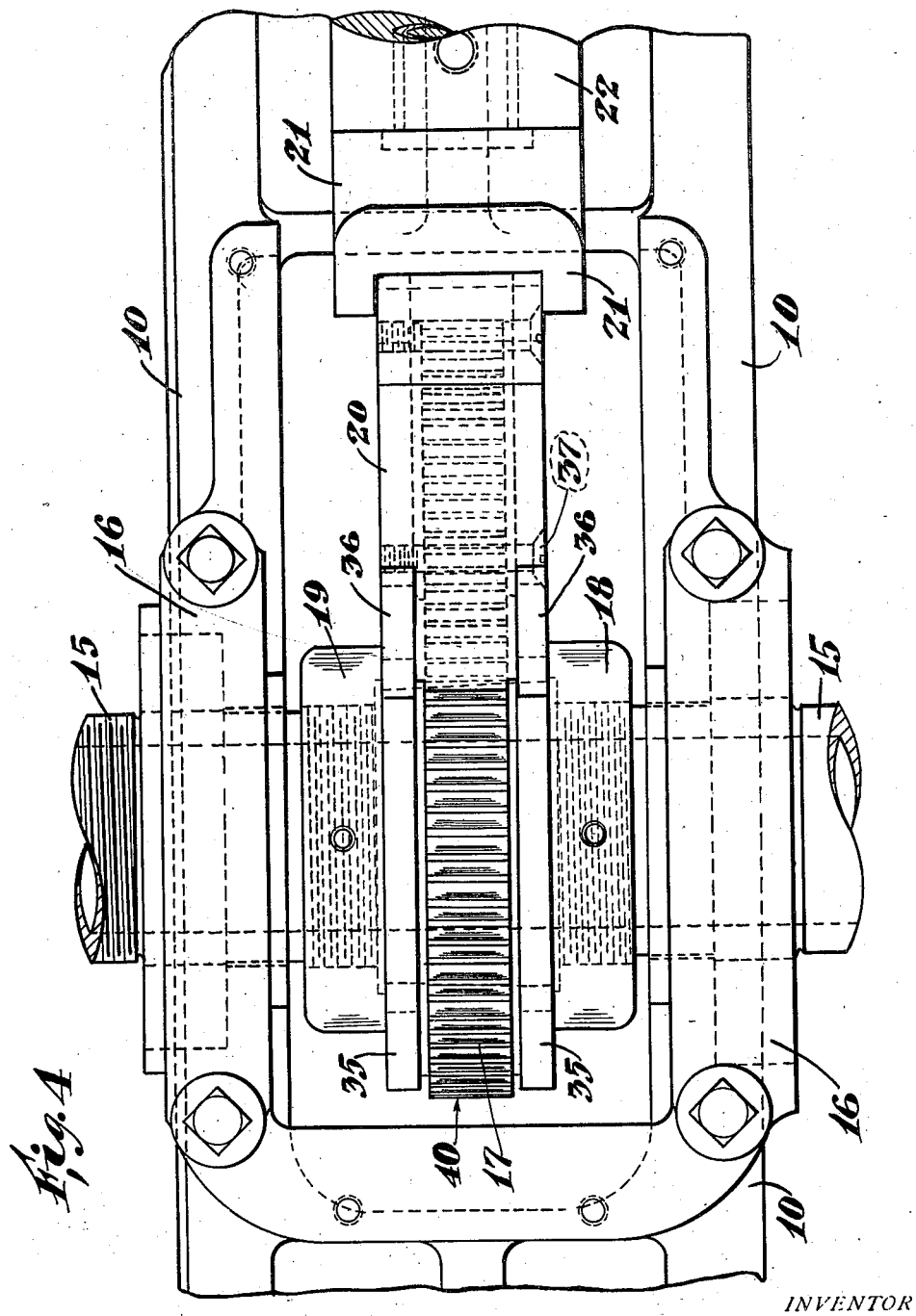

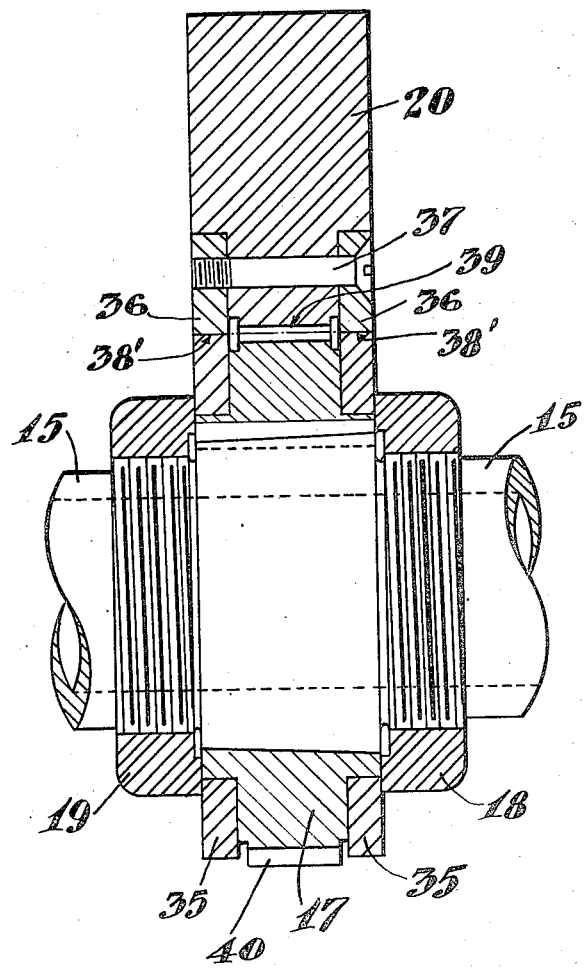

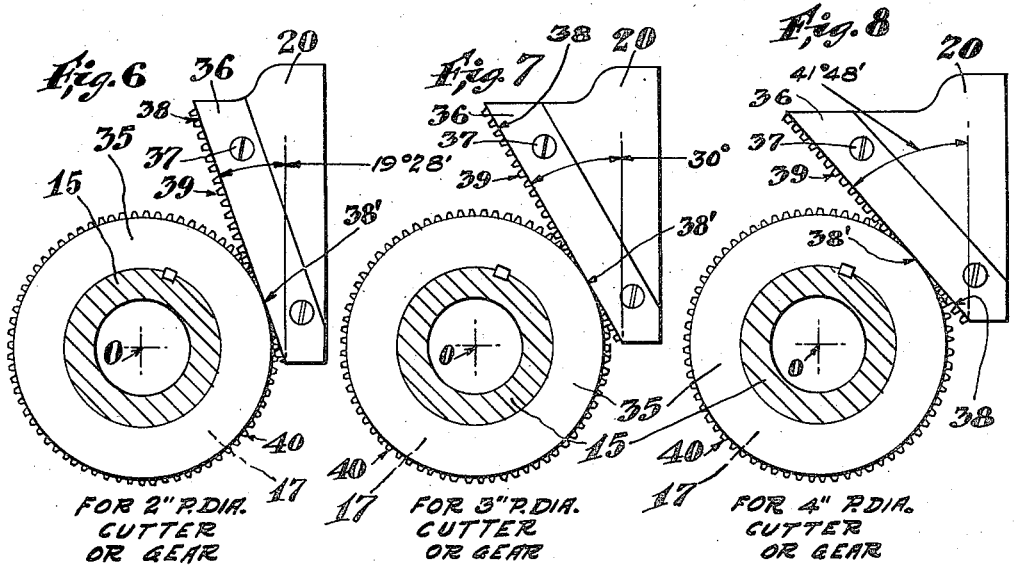
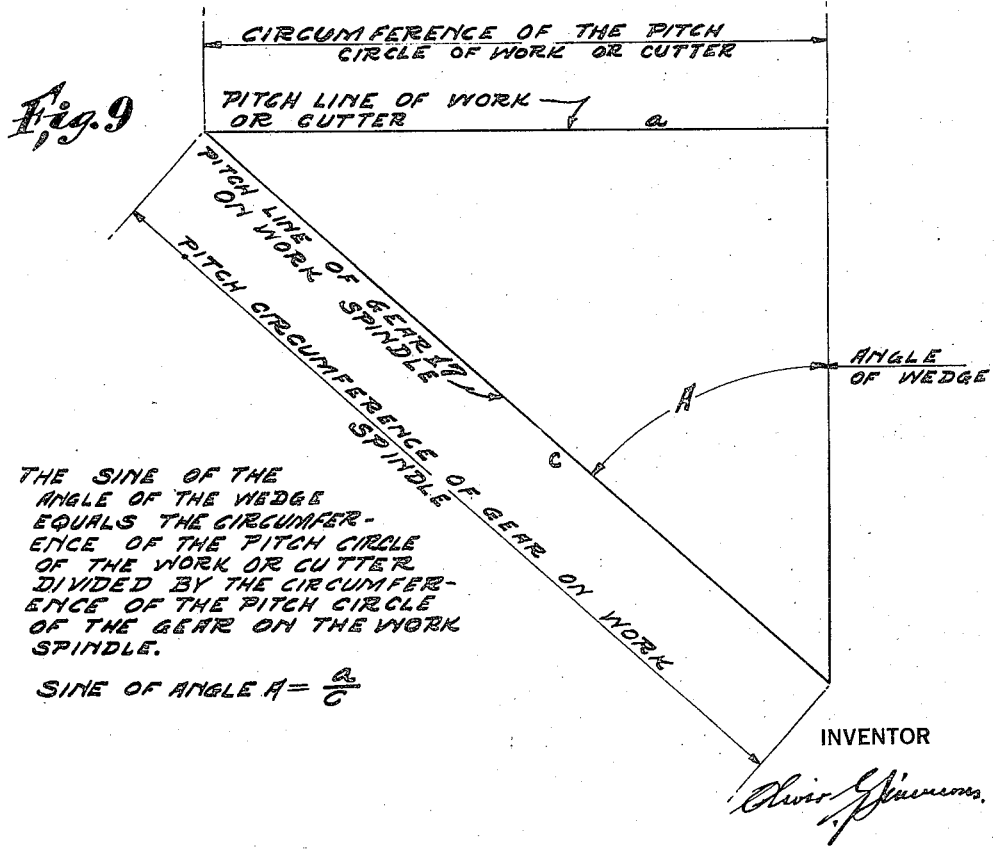

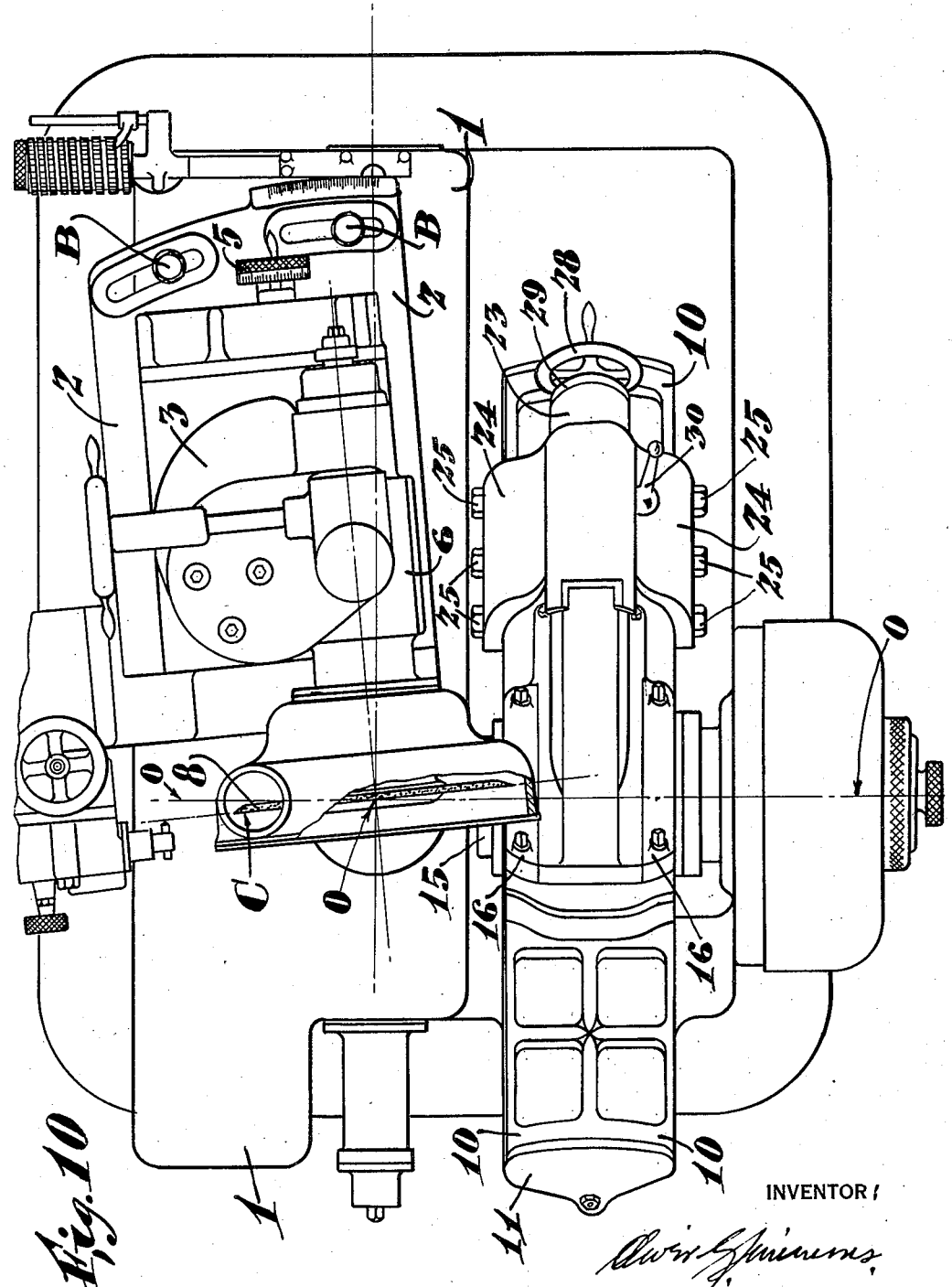

1,697,666

UNITED STATES PATENT OFFICE.

OLIVER G. SIMMONS, OF LAKEWOOD, OHIO.

MACHINE FOR GENERATING THE TEETH OF GEARS AND GEAR-SHAPED CUTTERS.

Application filed August 27, 1926. Serial No. 131,885.

My invention relates to improved means for actuating the work-carrying slide uniformly with the oscillating motion of the work spindle carried by said slide to a given pitch circle diameter or to a given base circle diameter to produce the true curvature of predetermined form on the teeth of gears and gear shaped cutters. The invention as disclosed in this specification and as illustrated in the drawings to be referred to later, is shown as applied to my machine described and illustrated in my application for Letters Patent of the United States for method of and machine for grinding the teeth of gears and gear shaped cutters, Serial No. 98,791, filed March 31st 1926, and application Serial No. 264,626, filed March 26, 1928, for method of and apparatus for generating helical gears.

In a machine for grinding the teeth of gears and gear shaped cutters and all kindred articles of manufacture where the greatest precision is required, it is essential that the interrelation of the movement of the slide with respect to the oscillating motion of the work spindle carried by the slide, be correlated positive and of precise magnitude. The main object of the present invention, therefore, is to provide correlated positive mechanical means of precise magnitude for machines adapted to generate the curved teeth of gears, gear shaped cutters and all kindred articles of manufacture.

A further object of the invention is to provide the work spindle carried by a slide member with a gear member adapted to mesh with a rack member so that as the work spindle is rotated, the rack will cause the slide to move in a rectilinear path, the pitch line of said rack forming an angle with the rectilinear path of travel of the slide.

A still further object of the invention resides in the method by which a slide is caused to move in a rectilinear path through motions translated from rotary into rectilinear in a plane perpendicular to said rectilinear path of movement of said slide.

Another object of the invention resides in the method of determining the magnitude of the angle of the pitch line of the rack with respect to the plane of movement of said rack.

Other objects of the invention reside in the method and means by which the measure of the magnitude of the movement of a slide in a rectilinear path is controlled by a member reciprocating in a plane disposed at an angle to the plane of the rectilinear movement of the slide; of a source of power applied to the work spindle, or work spindle sleeve member, by which said member is given a reciprocating movement by means of a gear and an intermeshing rack, the pitch line plane of said rack being disposed at an angle to the plane of movement of the slide; means to support said slide upon a swivelling member adapted to be disposed to the angle of pressure with respect to a cutting element when operating on the moulding generating principle of action and in a position whereby the rectilinear path of travel of said slide will be in a plane perpendicular to said cutting element when operating on the describing generating principle of action; a member fixedly secured to said swivel member and adjustable means connected with said fixed member, having a member secured thereto forming an abutment upon which a rack member in the form of a wedge is adapted to slide; of means to actuate said adjustable member whereby the axis of the work spindle, journalled transversely in said slide, is adapted to be adjusted with respect to the cutting element; means to securely fix said adjustable means in said adjusted position; means to dispose the plane of the cutting element parallel to the axis of the work spindle when grinding spur gears and to an angle thereto when grinding helical gears and helically disposed teeth of helical gear shaper cutters or to the small angle of clearance required when grinding gear shaper cutters adapted to cut the teeth of spur gears in the Fellows gear shaper; means exerting a constant force to the slide in one direction and independent means connected to the work spindle and to the aforesaid rack wedge member to take the force aforesaid to eliminate wedging action between teeth of the intermeshing rack and gear; of the correlation of the rotary oscillating movement of the work spindle and the rectilinear movement of the slide, said correlation being fixed so that if the movement of the work spindle is uniform, the movement of the slide will be uniform and vice versa. If the movement of the work spindle is non-uniform the movement of the slide will be non-uniform. These movements being correlated, the ratio of the rectilinear movement of the slide and the rotary movement of the work spindle will bear the same relation, so that if one movement is accelerated and then decelerated so also will the other one be accelerated and decelerated in the same correlated ratio.

A still further object of the invention is to provide when the machine is operating on the moulding generating principle of action, that the rack wedge member be provided with an angle A determined by the following equation:

Sine of angle $A = \dfrac{a}{c}$ in which $a$ equals the circumference of the pitch circle of work or cutter and $c$ equals the pitch circumference of gear on the work spindle. When operating on the describing generating principle of action the pressure angle of the work will be zero and the slide will be set normal to the cutting element (at right angles thereto) and the base circle will be considered as also the pitch circle. The above equation, therefore, will hold true whether the machine operates on the describing generating or the moulding generating principle of action.

With the above and other objects in view the invention comprises broadly the method and the embodiment of the method and means attained by the structure illustrated in the accompanying drawings hereinafter described and particularly set forth in the appended claims together with such variations and modifications thereof as will be apparent to those skilled in the art to which the invention appertains. Reference should be had to the accompanying drawings forming a part of this specification.

Fig. 1, is a front view in elevation of a portion of a well-known gear and gear shaped cutter grinding machine, partly in fragmentary section showing the present invention and its application to that machine.

Fig. 2, is similar to Fig. 1, except in this view the slide is shown at the other end of its stroke.

Fig. 3, is an enlarged view in sectional elevation of the present invention.

Fig. 4, is a plan view showing fragmentary portions of the slide, work spindle and adjustable member with the cover removed therefrom and the arrangement of the present invention with respect to these parts.

Fig. 5, is a section 5—5 of Fig. 3, looking in the direction of the arrow.

Fig. 6, is a front elevation of the gear and rack wedge showing the rack wedge as it will appear for a 2" pitch diameter cutter or gear. Part of the work spindle is shown in section.

Fig. 7, is similar to Fig. 6, except that the rack wedge is shown for 3" pitch diameter cutter or gear.

Fig. 8, is also similar to Fig. 6, except in this view the rack wedge is shown as it would be designed for a 4" pitch diameter cutter or gear.

Fig. 9, illustrates the trigonometrical functional relation of the pitch circle of the work on the work spindle and the pitch circle of the gear fixedly secured to the work spindle, and the resultant algebraic equation in the lower left hand corner of the sheet.

Fig. 10 is a top plan view of the machine.

Numeral 1 indicates the bed of the machine upon which is mounted upright swivel base 2. The upright 3 is adapted to engage the slide on swivel base 2, through the medium of V-ways, not shown, by means of the screw 4 having threaded engagement with swivel base 2, the hand-wheel 5 being secured to said screw 4. The adjustable vertical slide 6 is adapted to engage the V-ways 7 on the upright 3. The cutting element 8, which may be an abrasive wheel or a milling cutter is carried by a spindle in the slide 6. The cutting element 8 may be rotated by any suitable means. Swivel member 9 is adjustably mounted on a bearing carried by and fixedly secured to bed 1. Slide 10 engages V-ways on swivel member 9 and is adapted to move in a rectilinear path thereof. The end plate 11 is secured to the end portion of the slide 10 to which is fixedly secured the eye-bolt 12, through which a cable 13 is passed and secured. The other end of the cable 13 has a weight attached which causes the slide 10 to exert force in the direction of the arrow 14.

The work-sleeve spindle 15 is journalled in a portion of the slide 10 by means of the bearing-caps 16. The gear 17 is fixedly secured to the work-sleeve spindle 15 and held in place on said member by means of the nuts 18 and 19, see Fig. 4, which have threaded engagement with the work-sleeve spindle 15. The rack wedge member 20 has tooth engagement with said gear 17 as shown. The rack wedge member 20 is adapted to engage and to slide in a rectilinear path on the abutment 21, said abutment being secured to adjustable tail-stock spindle member 22 carried by the fixed tail stock member 23, said tail-stock member being fixed with respect to swivel member 9. The lower portion 24 of said tail-stock member straddles the slide member 10 and is fixedly secured to said swivel member 9 by means of the cap-screw bolts 25. The nut 26 is fixedly secured to one end of the tail-stock spindle 22 and has threaded engagement with the screw 27, to which is also secured the hand-wheel 28. The flange 29, forming the necessary shoulder bearing for said screw 27, will cause tail-stock spindle 22 to move in or out of the tail-stock 23 as the hand-wheel 28 is rotated one way or the other way for a purpose to be later described, and when so adjusted to a given position, the tail-stock spindle 22 may be fixedly secured in said position by means of the clamping-handle 30. The action of the clamping member 30 to lock tail-stock spindle 22 to tail-stock 23 is well-known in the art and no other detailed description is thought to be necessary.

It is apparent that as tail-stock spindle 22 is moved to the left or right of the person viewing the drawing that the slide 10 will be moved in accordance therewith. Inasmuch as it will later be shown that since gear 17 cannot rotate except as it is rotated in an oscillating manner, to be later described, the slide 10 will be given an additional rectilinear movement of adjustment to the right or left of the person viewing the drawing, which movement is independent of other rectilinear movement of the slide.

Bed 1, swivel base 2, upright 3, slide 6, cutting element 8, swivel 9, slide 10, plate 11, eye-bolt 12, cable 13, tail-stock spindle 22, tail-stock 23 and its fixed position with respect to swivel 9, form a part of the subject matter of my application for patent, Serial No. 98,791, filed March 31st, 1926, previously referred to, and are, therefore, no part per se of the present invention.

The work-sleeve spindle 15 of the present invention is actuated to oscillate by means of the bell-crank 31 and connecting rod 32 from a source of power as fully set forth in application for patent previously referred to. In the present invention it is believed to suffice to say, therefore, see Fig. 1, that as the work spindle 15 is rotated in the direction of the arrow 33, the gear 17 will cause the rack wedge to move downward and cause the slide 10 to move in the direction of the arrow 34 and lift the weight suspended on the end of the cable 13. The movement is continued to the position shown in Fig. 2. When the action of the bell-crank 31 is reversed, the work spindle moves in the opposite direction, raising wedge 20 whereupon the slide 10 by virtue of the weight itself, and the force exerted by the weight suspended on cable 13, will return to its former position as shown in Fig. 1.

It is obvious that the magnitude of the rectilinear movement of the slide 10 on swivel member 9 will depend upon the pitch diameter of gear 17 and the inclination of the pitch line of the rack wedge 20. It is also obvious that the rack wedge 20 will move uniformly with the work spindle gear 17, regardless of the uniformity or non-uniformity of movement of said gear. In other words, if gear 17 is moved with a uniform velocity rack wedge 20 will be moved with a uniform velocity and likewise slide 10 will move with a uniform velocity, and, moreover, if gear 17 is moved with a non-uniform velocity, for example; accelerated and then decelerated, the movement of the rack wedge 20 will be uniform with the movement of the gear 17, but its movement with respect to the abutment 21 will be non-uniform, likewise the movement of slide 10 will be non-uniform with respect to swivel member 9, but the ratio between the rectilinear movement of the slide 10 and the oscillating rotary movement of the gear 17 will be correlated therewith and, therefore, uniform with it and to the given ratio as previously referred to and as will be later more fully described.

In the movement of the slide it is obvious that the abutment member 21 may be moved to a position to adjustment by means of the tail-stock spindle 22 independently of the movement or absence of the movement of the slide 10. It is also obvious that if no means are provided to take the thrust exerted by the weight of the slide and its apparatus and the force of the weight suspended to cable 13, there will be quite a component exerted between the intermeshing teeth of the rack wedge 20 and the gear 17. This is highly objectionable and to take care of this component the gear 17 and the rack wedge 20 are constructed as follows, see Fig. 5:

The gear 17 is preferably provided with the flange rings 35, having a diameter corresponding to the pitch diameter of the gear 17. The rack wedge 20 is provided with end plates 36 fixedly secured to rack wedge 20 by means of the bolts 37. The front edge 38 of the end plates 36 are arranged to coincide with the pitch line of the rack teeth 39 of the rack wedge 20, so that the component of the force referred to is taken by the rings 35 of the gear 17 and the end plates 36 of the rack wedge 20, thus the function of the teeth 39 and 40 of the intermeshing rack wedge 20 and the gear 17 is that of the translation of motion only, to the end, the teeth are burdened with this force only as distinguished from the component of thrust exerted by the slide and the weight suspended from cable 13.

The contact 38' is tangential and the rings 35 will roll upon the end plates 36 and inasmuch as each coincide with the pitch line there will be no slippage. It has been found in the practice of this invention that it is not necessary to produce teeth 40 of the gear 17 and teeth 39 of the rack wedge 20 to limits of error other than those usually specified with reference to first-class machine work. In other words, the teeth of the rack and the teeth of the gear are not in any sense master rack and gear, since slight errors may exist in each without materially affecting the truth of the curves of the teeth of the work. It has also been found in the practice referred to that it is relatively unimportant whether back-lash or play exists between the teeth 39 or the rack wedge and the teeth 40 of the gear, because of the weight suspended to the end of cable 13, which will, in the operation of the machine referred to, and in the application of the present invention, cause the gear teeth 40 to constantly contact on one side of the teeth 39 of the rack wedge 20. In the operation of the machine set forth, the connecting rod 32 and bell-crank 31 determine the movement of the gear 17, and the inherent inclinations are such as to cause the rack wedge 20, to exert component force in a vertical direction and always in that direction to raise same regardless of whether the slide is moved in the direction of the arrow 34, Fig. 1, or in the direction opposite to that, see Fig. 2. This becomes quite obvious by an inspection of the enlarged fragmentary sectional view of Fig. 3. The slide in this view is shown as having moved to the extreme left hand position of the person viewing the drawing.

For a further understanding of the invention reference is made to Figs. 6, 7, 8 and 9 which embody some concrete examples.

If it is desired that the cutting element 8 generate true involute curved profiles on the face of the teeth of the work, there are two principles of action by which this may be accomplished in the present invention as it is applied to the machine referred to. The difference between each method may be briefly stated to reside in the following:

In the describing generating principle of action, the pressure angle is not considered, since it is zero and the rectilinear path of movement of the slide will be in a plane at right angles to the face C, Figs. 1, 2 ad 3, of the cutting element 8, and the actual effective portion of the face C of the cutting element 8, in a given tangential point of contact between said cutting face C and the involute normal to said face, said face is, at all times, when operating on this principle, perpendicular to a line tangent to the base circle; whereas, in the moulding generating principle of action, the rectilinear path of movement of the slide 10, is disposed at an angle to the face C, of the cutting element 8, corresponding to the pressure angle of the involute desired in which the actual effective portion of the cutting element 8, will lie across the face C of the cutting element 8, and not only at a tangential point of contact as in the describing generating principle of action. The two principles of action herein referred to are fully set forth in the book "Gear cutting machinery" by Ralph E. Flanders, published by John Wiley & Sons, New York.

It may be stated further that in the describing generating principle of action as it should be practiced in the machine herein referred to in the invention set forth, that when operating on the describing generating principle of action, the base circle is to be considered also the pitch circle and the swivel member 9 should be set at zero pressure angle as referred to, and when operating on the moulding generating principle of action the pitch circle may be selected and the swivel member 9 swivelled to a pressure angle determined by any base circle smaller than the pitch circle referred to.

Let it be assumed that we desire to grind true involute curves on the teeth of the work having a two inch pitch diameter. Fig. 6 indicates that the angle of the rack wedge member 20 is 19° 28'. If then, the swivel is set at zero normal to the face C of the cutting element 8, a true involute curve to a two inch diameter evolute or base circle will be generated on the face of the teeth of the work. If, however, it is desired that the work have a pressure angle resulting in an evolute or a base circle smaller than the two inch base circle above referred to, for which the wedge shown in Fig. 6 having an angle of 19° 28' is adaptable, it is only necessary to set swivel member 9 to the selected pressure angle whereupon the involute determined by a base circle smaller than two inches diameter will be generated and the diameter of this evolute or base circle will be determined by the equation as follows:

The pitch circle diameter, for which the rack wedge has been adapted, times the cosine of the pressure angle will give the base circle diameter. For example: In Fig. 6 the rack wedge 20 is shown as having been adapted for two inch pitch diameter cutter. Let it be assumed that the pressure angle of the gear or cutter to be ground having true involute curves is equal to 20°. Two times the cosine of 20°, therefore, will give the diameter of the evolute or base circle. This is more fully set forth in my article "The law of the involute" published in the American Machinist issues Nov. 23 and 30, 1922. In like manner Fig. 7 indicates that the angle of the rack wedge 20 for a three inch pitch diameter cutter or gear is 30° and likewise in Fig. 8 the angle of the rack wedge 20 is 41° 48' for a four inch pitch diameter cutter or gear.

It is understood from the foregoing that any pressure angle within the capacity of the machine may be used by simply setting the swivel member 9 to that pressure angle without change of parts, it being merely a matter of adjustment to the swivel 9 as referred to.

The pitch diameter of the gear 17 may be arbitrarily selected, determined upon the size of the work, and it will be noted that with reference to Figs. 6, 7 and 8 the same size gear is used, since this gear can be selected of such size as to enable all size gears and cutters within the capacity of the machine to be ground without change of parts except the substitution of rack wedge member 20.

Fig. 9 is a graphical illustration of the trigonometrical method by which the angle A is determined. It must be borne in mind that there are two principles of action and three methods by which involute curves on the face of teeth of cutters or gears may be generated. One method involves the movement of a point, another the movement of an inclined plane, the other and last, the movement of an involute curve itself. The first comes within the scope of describing generating whereas the last two are moulding generating.

Since the cutting element 8 is provided with a cutting face C which is a plane, we are concerned with the two methods first mentioned. That is to say, the point and the inclined plane. These methods are graphically illustrated and described in my article appearing in American Machinist referred to. Sufficing to say, therefore, that the point of the describing generating principle of action must move along a line tangent to and uniform with the rotary movement of the evolute. In the case of the inclined plane, the inclined plane must move uniformly along a line tangent to and with the rotary movement of the pitch circle. You will note that in the latter method, if the inclined plane were disposed perpendicular to the tangent line aforesaid, and moved with the same uniformity as the inclined plane, the principle of action would be changed from that of moulding generating to that of describing generating. In the describing generating the measure of the movement of the point for one turn of the evolute will correspond and be equal to the perimeter of the evolute. In the moulding generating principle having the inclined plane, the movement of this plane for one turn of the pitch circle must equal the measure of the perimeter of the pitch circle. The resultant involute generated by the point will have a lead therefore, equal to the perimeter of the evolute, whereas in the moulding generating principle the lead of the involute generated by the inclined plane will have a lead equal to the measure of the perimeter of an evolute circle smaller in diameter than the diameter of the pitch circle selected by the pitch circle diameter multiplied by the cosine of the pressure angle of the inclined plane. It is obvious, therefore, that the angle of the rack wedge 20 of the present invention may be determined very easily by means of the right-angle triangle, Fig. 9, in which the measure of the hypothenuse is equal to the pitch circumference of the gear 17 on the work spindle 15 designated by the letter $c$. In other words, the measure of the length of hypothenuse $c$ is equal to the measure of the perimeter of the pitch diameter of the gear 17, on work spindle 15, and the side $a$, opposite the angle, has a length equal to the measure of the perimeter of the pitch circle of the work or cutter, hence the sine of angle A of the rack wedge 20 equals the measure of the circumference of the pitch circle of the work or cutter divided by the measure of the perimeter of the pitch circle of gear on the work spindle. The equation takes the following form:

$$\text{sine of angle A} = \frac{a}{c}.$$

Let it be assumed that the work spindle 15 is given its oscillating rotary motion, uniform or non-uniform, as heretofore described. The gear 17 will cause the rack wedge 20 to move in a rectilinear path on the abutment slide 21, thus slide 10 will be caused to move in a rectilinear path on the swivel member 9 and the rectilinear motion of said slide 10 with respect to the rotary motion of the work-sleeve spindle 15, will depend upon the size of gear 17 and angle A of the rack wedge 20. It follows, therefore, that if as heretofore referred to, a uniform rotary motion is given to gear 17, slide 10 will move uniformly in a rectilinear path determined by the ratio between the elements 17 and angle A of the rack member 20. If, however, non-uniform motion is given to gear 17, the motion of slide 10 will be non-uniform, but nevertheless correlated therewith and in direct ratio of the elements 17 and 20.

One end portion of the cable 13 being secured to the end portion of the slide 10, having a weight attached to the other end of said cable 13, will cause slide 10 to move in the direction of the arrow 14 to a position of rest determined by any lost motion between the teeth 39 and 40 of the members 17 and 20, hence when force is applied to oscillate the work-sleeve spindle 15, slide 10 is actuated to move to lift the weight at the end of cable 13 and when the motion of the work-sleeve spindle 15 is reversed to the opposite direction, the weight continues to exert its force so that the lost motion, if any exists, between the teeth of the gear and the rack, the force being always in the same direction, functional operation of the means herein disclosed in a machine of the character set forth, results in the proposition that it will make no difference in the functional operation of the machine or in the accuracy of the work performed by said machine, what the magnitude of the lost motion is between the teeth of the members 17 and 20.

The weight on the end of the cable 13 exerting a component of force always in one direction will cause the slide 10 to seek its lowest possible position to the right of the person viewing the drawing, Fig. 1, arrested only by the position of the bell-crank 31 and the connecting rod 32. This force being constant will cause the work spindle 15 to exert a constant rotative force in the direction of the arrow 33 to be overcome only by the positive mechanical means applied to the work spindle 15 through the medium of the members of the connecting rod 32 and the bell-crank 31, in an application of the present invention of the machine referred to.

If now, the machine is operating, the work spindle oscillating and the slide reciprocating as described, it is obvious that an additional independent rectilinear movement will be given to the slide 10 if the hand-wheel 28 is rotated as heretofore referred to. The object of giving this independent movement to the slide is fully set forth in the pending application for patent herein referred to. It is thought, therefore, that it will only be necessary to state that this movement is necessary when grinding gear shaper cutters to enable the flanks of the teeth to be controlled with respect to fullness of the flanks of the gear shaper cutter teeth or non-fullness as the case may be. This flank fullness is controlled by the relative movement of the slide 10 with respect to the fixed position of the cutting element 8. If no flank fullness is required it is only necessary to allow the slide 10 which carried the work spindle 15 to move further to the right of the person viewing the drawing, Figs. 1, 2 and 3. If, however, flank fullness is required it is merely necessary to cause slide 10 to reverse its movement and return to its former position before the center O of the work spindle 15 coincides with the cutting face C is controlled by the position of the tail-stock spindle 22. In grinding gear shaper cutters which may have helically arranged teeth it is necessary to swivel the cutting element 8 about a vertical axis coincident with the cutting face C. This is provided for in the present invention by means of the swivel upright base 2. This base may be swivelled on bed 1 in a plane perpendicular to the plane of the drawings, Figs. 1 and 2, to any desired angle corresponding to the helical angle of the teeth of the gear shaper cutter, plus or minus any additional amount desired for clearance to said teeth and when so swivelled, said swivel base 2 may be locked in that position by means of the bolts B, passing through an elongated slot in said swivel base 2 and having threaded engagement with bed 1. It was previously stated that the invention herein disclosed is applicable to grinding machine set forth, wherein a swivel member 9 is disposed to the pressure angle desired in the gear when operating on the moulding generating principle of action to the end that the cutting face C of the cutting element 8 with the sliding-ways W of the slide 10, form an angle equal to the complemental pressure angle desired in the cutters or gears. It is only necessary, therefore, when the pitch diameter remains fixed to obtain a different pressure angle in the gear or cutter by merely disposing swivel member 9 to that angle of pressure. This is accomplished by any suitable means as for example, means illustrated and described in pending application herein referred to.

Claims:

1. In a machine of the character described a work spindle mounted for rotary and linear movements, a gear fixed to the spindle, and a rack meshing with the gear and mounted for movement bodily in a direction at right angles to the path of linear movement of the work spindle, the pitch line of said rack being disposed at an angle to its direction of movement, the sine of which is equal to the circumference of the pitch circle of the work divided by the circumference of the pitch circle of the gear which meshes with the rack.

2. The method of generating the curved teeth of gears and kindred articles of manufacture by causing the work spindle to oscillate about its axis, and translating this into an additional complemental correlated rectilinear bodily movement of the work spindle by imparting a rectilinear movement having a predetermined relation to the angular movement of the spindle to a slide actuating member moving in a plane disposed at an angle to the plane of bodily movement of the work spindle.

3. The method of causing a slide to move in a rectilinear path through rotative motions of a member on the slide translated into rectilinear movement of a slide actuating member in a plane perpendicular to said rectilinear path of movement of said slide.

4. The method by which the measure of the magnitude of the movement of a spindle carrying slide in a rectilinear path is controlled by the rectilinear movement of a member in a plane disposed at an angle to the plane of the rectilinear movement of said slide and constrained to move at a rate having a predetermined relation to the rate of angular movement of the spindle.

5. In a machine of the character set forth, a work spindle mounted for rotary and rectilinear movements, means for oscillating said spindle, a member fixedly secured to said work spindle, and a rack wedge member adapted to reciprocate and engaged by said first mentioned member, whereby said work spindle is given an additional rectilinear reciprocating movement, said rotary movement and said rectilinear movement being correlated and of precise magnitude.

6. In a machine of the character set forth, a slide, a work spindle journalled transversely in the slide, a member fixedly sesured to said work spindle, and a movable rack wedge member adapted to reciprocate and engaged by said first mentioned member, whereby said work spindle is given a rotary as well as a rectilinear movement, said rotary and said rectilinear movements of the work spindle being correlated and of precise magnitude.

7. In a machine of the character set forth, a cutting element, a work spindle, and means to cause correlated rotary and rectilinear movements between the cutting element and the work spindle, said means comprising a wedging member adapted to be reciprocated in a plane disposed at an angle to the plane of the said rectilinear movement.

8. In a machine for generating the teeth of gears and all kindred articles of manufacture, a slide, a work spindle journalled in the slide transversely thereof, a member fixedly secured to said work spindle, a movable wedge member engaged by said first mentiond member, means to cause said member to reciprocate whereby the work spindle is given a reciprocating movement, the magnitude of which movement for each reciprocation being correlated with a rotary oscillating movement imparted to said work spindle.

9. In a machine of the character set forth, a slide, a work spindle journaled on the slide, a tail stock, an abutment member carried by the tail stock, a rack wedge member slidable on the abutment member, means to oscillate the work spindle, a member fixedly secured to said work spindle adapted to oscillate therewith and having tooth engagement with the rack wedge member to reciprocate the same in a rectilinear path on the abutment member for causing the slide carrying the work spindle to be reciprocated; and means to adjust said tail stock to control the position of reverse of the reciprocating movement of the slide with respect to a cutting element.

10. In a machine of the character set forth, a slide, a work spindle journaled on the slide, a tail stock, an abutment member carried by the tail stock, a rack wedge member slidable on the abutment member, a work spindle journalled transversely in the slide, a member fixedly secured to said work spindle, a portion of which is provided with teeth adapted to engage the teeth of the movable rack wedge member adapted to reciprocate on the abutment member, whereby said work spindle is given a rotary as well as a rectilinear movement, means to adjust and fixedly secure tail stock spindle in said adjusted positions, whereby the position of the work spindle with respect to a cutting element at the time of reverse of the reciprocating movement of the slide is controlled; and means to adjust the path of travel of the slide with respect to the plane of rotation of the cutting element aforesaid.

11. The method of generating curved surfaces upon a blank which comprises moving a blank relatively to a cutting element with correlated rotary and linear motions by constraining the blank to a rolling movement with respect to a rigid member along a path inclined with respect to the linear path of movement of the blank, and imparting reciprocating movements to said rigid member in a path angularly disposed with respect to the path of rolling movement of the blank along the same.

12. The method of generating curved surfaces upon a blank which comprises moving a blank relatively to a cutting element with correlated rotary and linear motions by constraining the blank to rectilinear movement in a predetermined path and to rolling movement with respect to a member which is constrained to movement in a rectilinear path at an angle to the path of movement of the blank, and simultaneously imparting reciprocating movements to said blank and rigid member.

13. The method of generating curved surfaces upon a blank which comprises moving a blank relatively to a cutting element with correlated rotary and linear motions by constraining the blank to linear movement in a predetermined path and to rolling movement along a movably mounted rigid member which extends at an angle to the path of movement of the blank, oscillating the blank about its axis and simultaneously moving said rigid member bodily and without angular movement in a direction at an angle to the linear path of said blank.

14. The method of generating curved surfaces upon a blank which comprises moving a blank relatively to a cutting element with correlated rotary and linear motions by constraining the blank to linear movement in a predetermined path and to rolling movement along a movably mounted rigid member which extends at an angle to the path of movement of the blank, oscillating the blank about its axis, maintaining said movable rigid member at a fixed angle to the path of movement of the blank and at a fixed distance from the axis of the blank, and holding said rigid member against movement longitudinally of the path of the blank.

15. The method of imparting rolling movement to a blank which comprises constraining the blank to a linear movement in a given plane and to rolling movement along a movable member corresponding to that of a circle of given diameter concentric with the axis of the blank along a straight line on said member and moving said member bodily in a direction at an angle to said line of rolling movement, the sine of said angle being equal to the circumference of the pitch circle of the blank divided by the circumference of the rolling circle.

16. In a machine of the character set forth, a slide having a work spindle thereon, a guideway for the slide, an abutment fixed with respect to the slide, a wedge member interposed between the abutment and slide, and means for moving the wedge member bodily in a direction transverse to said guideway and for constraining said spindle to a rolling movement with respect to the adjacent face of the wedge member.

17. In a machine of the character set forth, a slide having a work spindle thereon, a guideway for the slide, a rigid member extending at an angle to the guideway and means for moving said member bodily and without angular movement in a direction transverse to said guideway and for constraining said spindle to a rolling movement along said member.

18. In a machine of the character described, a slide having a work spindle thereon, a guideway for the slide, a rigid member extending at an angle to the guideway, means for imparting a rotative movement to the spindle, and means for constraining the spindle to a rolling movement along said member, and for maintaining said member at a fixed distance from the axis of the spindle and at a fixed angle to the guideway including an abutment having a face disposed at an angle to the guideway with which said member engages.

19. In a machine of the character described, a slide having a work spindle thereon, a guideway for the slide, an abutment having a face extending at an angle to the guideway, a wedge member having one face slidable along the face of said abutment and a face overlying said spindle, means for oscillating the spindle, and means interposed between the spindle and wedge member to impart reciprocating movements to the wedge member and slide and to constrain said spindle to a rolling movement with respect to the adjacent face of the wedge member.

20. The method of generating curved surfaces upon a blank which comprises moving a blank and cutting element one relatively with respect to the other angularly about the axis of the blank and linearly in a direction transverse to the axis of the blank by constraining the linear movement of the blank with respect to the cutting element to a fixed path, causing a relative angular movement of the blank with respect to the cutting element about the axis of the blank, and causing said linear movement by means of a member extending at an angle to the path of linear movement and constrained to move bodily and without angular movement in a direction transverse to said path at a rate proportional to the rate of said angular movement.

21. In a machine of the character described, a slide having a work spindle thereon, a guideway for the slide, a movable slide actuating member extending at an angle to said guideway, means including an abutment fixed with respect to the guideway for constraining said member to move bodily in a direction at an angle to said guideway, and means for imparting a rotative movement to the spindle and simultaneously moving said member bodily at a rate proportional to the rate of angular movement of the spindle.

22. In a machine of the character described, a slide having a work spindle thereon, a guideway for the slide, a movable slide actuating member extending at an angle to said guideway, means including an abutment fixed with respect to the guideway for constraining said member to move bodily in a direction at an angle to said guideway, and means for imparting a rotative movement to said spindle, and means interposed between said spindle and member for imparting a movement to said member at a rate proportional to the rate of angular movement of the spindle.

23. In a machine for generating the teeth of helical gears, gear shaper cutters and the like, a cutting element, a work spindle, and means to cause correlated, rotary and rectilinear movements between the cutting element and the work spindle, said means comprising a wedging member adapted to be reciprocated in a plane disposed at an angle to the plane of the said rectilinear movement and means to adjust the cutting element angularly with respect to the axis of the work spindle to the desired helical angle in helical gears, gear shaper cutters and the like.

24. In a machine for generating the teeth of helical gears, gear shaper cutters and the like, a cutting element, a work spindle, and means to cause correlated, rotary and rectilinear movements between the cutting element and the work spindle, said means comprising a wedging member adapted to be reciprocated in a plane disposed at an angle to the plane of the said rectilinear movement and means to adjust the cutting element angularly with respect to the axis of the work spindle to the desired helical angle in helical gears, gear shaper cutters and the like, said means comprising a swivel upright base mounted on a bed and adapted to be adjustably positioned angularly with respect to the work spindle and fixedly secured to said bed in said position.

25. The method of generating the teeth of gears, gear shaped cutters or the like having any desired pressure angle which comprises moving the blank relatively to a cutting element which operates in a given plane with correlated rotary and linear motions by constraining the blank to a rectilinear movement in a direction transverse to its axis and at an angle to the plane of the cutting element equal to the pressure angle of the gear to be generated, constraining the blank to a rolling movement with respect to a rigid member which is constrained to movement in a rectilinear path at an angle to the plane of movement of the blank, and simultaneously imparting reciprocating movements to the blank and rigid member, and adjusting the path of movement of the blank angularly with respect to the cutting element to generate gears of different pressure angles.

26. The method of generating the teeth of helical gears, gear shaped cutters or the like, which comprises moving the blank relatively to a cutting element with correlated rotary and linear motions by constraining the blank to a restilinear movement in a direction transverse to its axis and toward and from the cutting element, constraining the blank to a rolling movement with respect to a rigid member which is constrained to movement in a rectilinear path at an angle to the plane of movement of the blank and simultaneously imparting reciprocating movements to the blank and rigid member, and adjusting the cutting element angularly with respect to the axis of the blank to generate gears of different helix angles.

27. In a machine for generating the teeth of gears, gear shaped cutters or the like, a cutting element operating in a given plane, a pivotally mounted supporting member extending past the cutting element, a guideway on said supporting member, a slide mounted for movement in said guideway toward and from the cutting element, a work spindle on said slide, an abutment on said supporting member fixed with respect to said slide, a wedge member interposed between the abutment and slide, and means for moving the wedge member bodily in a direction transverse to said guideway and for constraining said spindle to a rolling movement with respect to the adjacent face of the wedge member, and means for adjusting said supporting member angularly with respect to the cutting element to generate gears to different pressure angles.

28. In a machine of the character set forth a slide having a work spindle thereon, a guideway for the slide, a gear on the work spindle, an abutment fixed with respect to the slide, and a wedge member slidable on the abutment and having a rack meshing with said gear, said rack having a bearing shoulder extending longitudinally thereof, and said gear having a peripheral bearing shoulder in rolling engagement with the shoulder of the rack.

29. In a machine of the character set forth a slide having a work spindle thereon, a guideway for the slide, a gear on the work spindle, an abutment fixed with respect to the slide, and a wedge member slidable on the abutment and having a rack meshing with said gear, said rack having a bearing shoulder extending longitudinally thereof and said gear having a cylindrical bearing shoulder coaxial therewith and of a diameter equal to the pitch diameter of the gear, said cylindrical shoulder having rolling engagement with the shoulder of the rack.

30. In a machine of the character set forth a slide having a work spindle thereon, a guideway for the slide, a gear on the work spindle, an abutment fixed with respect to the slide, and a wedge member slidable on the abutment and having a rack meshing with said gear, bearing plates attached to the opposite sides of the rack, said plates having bearing edges lying in the plane of the pitch line of the rack, and bearing rings attached to opposite sides of the gear and having an external diameter equal to the pitch diameter of the gear, said bearing rings having rolling engagement with the bearing plates of the rack.

Signed this 25th day of August, 1926.

OLIVER G. SIMMONS.